(12) United States Patent
Al-Jlil

(10) Patent No.: US 8,187,464 B2
(45) Date of Patent: May 29, 2012

(54) APPARATUS AND PROCESS FOR DESALINATION OF BRACKISH WATER USING PRESSURE RETARDED OSMOSIS

(75) Inventor: Saad A Al-Jlil, Riyadh (SA)

(73) Assignee: King Abdulaziz City for Science and Technology "KACST", Riyadh (SA)

( * ) Notice: Subject to any disclaimer, the term of this patent is extended or adjusted under 35 U.S.C. 154(b) by 0 days.

(21) Appl. No.: 13/338,071

(22) Filed: Dec. 27, 2011

(65) Prior Publication Data

US 2012/0091061 A1    Apr. 19, 2012

Related U.S. Application Data

(63) Continuation-in-part of application No. 13/175,860, filed on Jul. 3, 2011, now Pat. No. 8,147,697.

(51) Int. Cl.
| B01D 15/04 | (2006.01) |
| B01D 11/00 | (2006.01) |
| B01D 63/00 | (2006.01) |
| B01D 3/10 | (2006.01) |

(52) U.S. Cl. ..... 210/640; 210/644; 210/175; 210/195.2; 210/738; 203/10; 202/200; 202/202; 202/97

(58) Field of Classification Search ............ 210/640, 210/175, 257.2, 195.2, 723, 738, 650, 644, 210/649, 652; 202/97, 200, 202; 203/10
See application file for complete search history.

(56) References Cited

U.S. PATENT DOCUMENTS

| 4,834,793 | A  | * | 5/1989 | Schneider et al. | ............... 75/743 |
| 5,501,798 | A  | * | 3/1996 | Al-Samadi et al. | ........... 210/652 |
| 7,392,848 | B1 | * | 7/2008 | Bader | ........................ 166/371 |
| 7,744,761 | B2 | * | 6/2010 | Constantz et al. | ............ 210/652 |
| 7,789,159 | B1 | * | 9/2010 | Bader | ........................ 166/371 |
| 7,871,522 | B2 | * | 1/2011 | Stover et al. | .................. 210/652 |
| 7,955,506 | B2 | * | 6/2011 | Bryan et al. | ................... 210/644 |
| 2009/0152199 | A1 | * | 6/2009 | Ma et al. | ...................... 210/640 |
| 2011/0233137 | A1 | * | 9/2011 | Cath et al. | ..................... 210/644 |

OTHER PUBLICATIONS

Y.Wu et al. Microporous membranes in membrane distillation, 1986, Pure & Appl. Chem., vol. 58, No. 12, pp. 1657-1662.
Drioli et al. Integrating Membrane Contactors Technology and Pressure-Driven Membrane Operations for Seawater Desalination Energy, Exergy and Costs Analysis, 2006, Chemical Engineering Research and Design, 84(A3): 209-220.
K. Schneider, et al. Membranes and Modules for Transmembrane Distillation, 1988, Journal of Membrane Science, 39 (1988) 25-42.
Efrem Curcio Etal., Membrane Crystallizers, 2001, Ind. Eng. Chem. Res. 2001, 40, 2679-2684.

(Continued)

Primary Examiner — Ana Fortuna
(74) Attorney, Agent, or Firm — Geeta Kadambi; Riddhi IP LLC

(57) ABSTRACT

Water from underground and other sources is brackish and not suitable for human consumption. Naturally present dissolved chemicals in water make it brackish. The precipitants and dissolved chemicals need to be separated from water to make it consumable. A combination of aeration systems, filtration systems, crystallizers and hydrophobic membrane carrying filter are used to desalinate the brackish water. Pressure retarded osmosis process using an apparatus is also used to further purify water. Various heat exchange apparatus are used for energy conservation and efficient processing of water in a feasible way. The disclosure enables to purify water and provide a useful technology to eradicate water scarcity.

9 Claims, 3 Drawing Sheets

OTHER PUBLICATIONS

Kevin W. Lawson, Membrane distillation, 2006, Journal of Membrane Science 124 (1997) 1 25.

Sanjay Nene et al. Membrane distillation for the concentration of raw cane-sugar syrup and membrane clarified sugarcane juice, 2002, Desalination 147 (2002) 157-160.

V.D. Alves et al. Orange juice concentration by osmotic evaporation and membrane distillation: A comparative study, 2006, Journal of Food Engineering 74 (2006) 125-133.

Cassano et al. Production of concentrated kiwifruit juice by integrated membrane process, 2004, Food Research International 37 (2004) 139-148.

Marek Gryta, Osmotic MD and other membrane distillation variants, 2005, Journal of Membrane Science 246 (2005) 145-156.

Cassano A. et al. Concentration of clarified kiwifruit juice by osmotic distillation, 2007, Journal of Food Engineering 79 (2007) 1397-1404.

Cath et al. Experimental study of desalination using direct contact membrane distillation: a new approach to flux enhancement, 2004, Journal of Membrane Science 228 (2004) 5-16.

Lagan et al. Direct contact membrane distillation: modelling and concentration experiments, 2000, Journal of Membrane Science 166 (2000) 1-11.

Bandini et al. Concentration of must through vacuum membrane distillation, 2002, Desalination 149 (2002) 253-259.

Bourawi et al. Application of vacuum membrane distillation for ammonia removal, 2007, Journal of Membrane Science 301 (2007) 200-209.

Calabaro et al. Theoretical and Experimental Study on Membrane Distillation in the Concentration of Orange Juice, 1994, Ind. Eng. Chem. Res. 1994,33, 1803-1808.

\* cited by examiner

APPARATUS AND PROCESS FOR DESALINATION OF BRACKISH WATER USING PRESSURE RETARDED OSMOSIS

CROSS REFERENCE TO RELATED APPLICATION

This application is a continuation in part of an application Ser. No. 13/175,860 filed on Jul. 3, 2011. The pending U.S. application Ser. No. 13/175,860 is hereby incorporated by reference in its entireties for all of its teachings.

FIELD OF TECHNOLOGY

This disclosure relates generally to an apparatus, a system and method of desalinating brackish water using pressure retarded osmosis (PRO). More particularly, to a method of using pressure retarded osmosis along with other apparatuses to desalinate well water.

BACKGROUND

Water is a precious resource and one of the natural elements that needs to be conserved. Many regions in the world have scare water resources and the heavy industrial use further depletes the natural resource in developed and developing countries. In countries like Saudi Arabia it is critical to manage this resource and maximize the use.

Recent rural and urban development along with increase in population requires more good quality water not only for drinking but also for other uses. The water shortage is becoming a global issue especially in the arid and semi-arid regions of the world. According to United Nations (1999), water shortage, besides the global warming, has been considered as the most worrying problem for the new millennium. Keeping in view this scenario, the importance of brackish water desalination technology has gained momentum for the production of safe drinking water. Moreover, the conventional water desalination technologies such as reverse osmosis (RO) and others suffer from many disadvantages. These technologies are expensive to be adopted in poor countries. The RO is a pressure driven process which is highly susceptible to fouling. In addition to that, the cost effectiveness of the RO plants is strongly dependent on the energy resources such as oil and gas prices. There is a need for alternative approaches over the conventional desalination technologies.

SUMMARY

The disclosure describes an apparatus, a system and a process of desalinating brackish water to restore and/or maintain the basic life-sustaining natural elements, i.e., water. More particularly an apparatus, system and process for desalinating brackish water using different configuration of the apparatus comprising pressure retarded osmosis is described.

In one embodiment, desalination of brackish water using novel aeration system is described. In another embodiment, a filtration system is described. The filtration system may be used in combination with the aeration system. In another novel embodiment, an apparatus to perform pressure retarded osmosis is used along with aeration system and the filtration system to desalinate water. In one embodiment, the instant method of desalination the water has no brine remaining after it has gone through the apparatus, system and process.

In one embodiment, the diluted brine is used to recycle the heat contained in the well water. The diluted brine from the pressure retarded system (PRO system) is fed back along with feed stream for further purification.

In one embodiment, multiple units in parallel comprising of hydrophobic membranes are used as membrane distillation system. The membrane distillation system may be used with a vacuum pump. The vacuum may be used on one side of the unit containing the membrane to have effective separation of the water vapor. The water vapor is collected in one embodiment as distillate water for human consumption. The water vapor may also be sent to the heat exchanger to provide heat to the feed stream coming from filtration system.

The brine water collected from the membrane units in parallel, in another embodiment, is sent to the pressure retarded osmosis unit to further get distilled. The diluted brine water may be sent back to the membrane distillation system for further purification after dilution of the brine water which has passed through the heat exchanger.

In one embodiment, the splitter collects the water vapor from the heat exchange and splits it into two streams. One feeds the PRO system and the other is directed as distillate water to a collection tank for consumption.

In one embodiment, suction fan is used to collect water vapor from aeration system and filtration system and passed on to the heat exchanger to use the latent heat.

In one embodiment, well water is passed through the multi unit in parallel membrane distillation system. Well water feed that is hot comes in contact with the hydrophobic membrane. Vacuum is applied on the permeate side of the membrane and the water vapor is collected. The water vapor is condensed and collected as a distillate.

In one embodiment, the distillate water is tested for acceptable level of heavy metal contaminant and may be sent back to the membrane distillation system for a second iteration for removal of dissolved contaminants if the levels are below local authority authorized level.

The methods, systems and processes disclosed herein may be implemented in any means for achieving various aspects, and may be executed manually or automated using a computer. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

In the instant disclosure several apparatuses, processes and systems for desalinating water and brackish water are disclosed. Although the present embodiments have been described with reference to specific example embodiments, it will be evident that various modifications and changes may be made to these embodiments without departing from the broader spirit and scope of the various embodiments.

The instant application discloses the apparatus, process and system that materially enhances the quality of the environment of mankind by contributing to the restoration or maintenance of the basic life-sustaining natural elements, i.e., water. The instant disclosure illustrates with example after removal of heavy metal and salt from water and brackish water may be used as drinking water, hence helping in restoration and reuse of natural resource such as water. Removing the precipitants as described in the instant disclosure helps recycle the unusable water and materially enhance the quality of the environment by contributing to the restoration of one of the basic life-sustaining natural elements, e.g., water.

Figure 1:
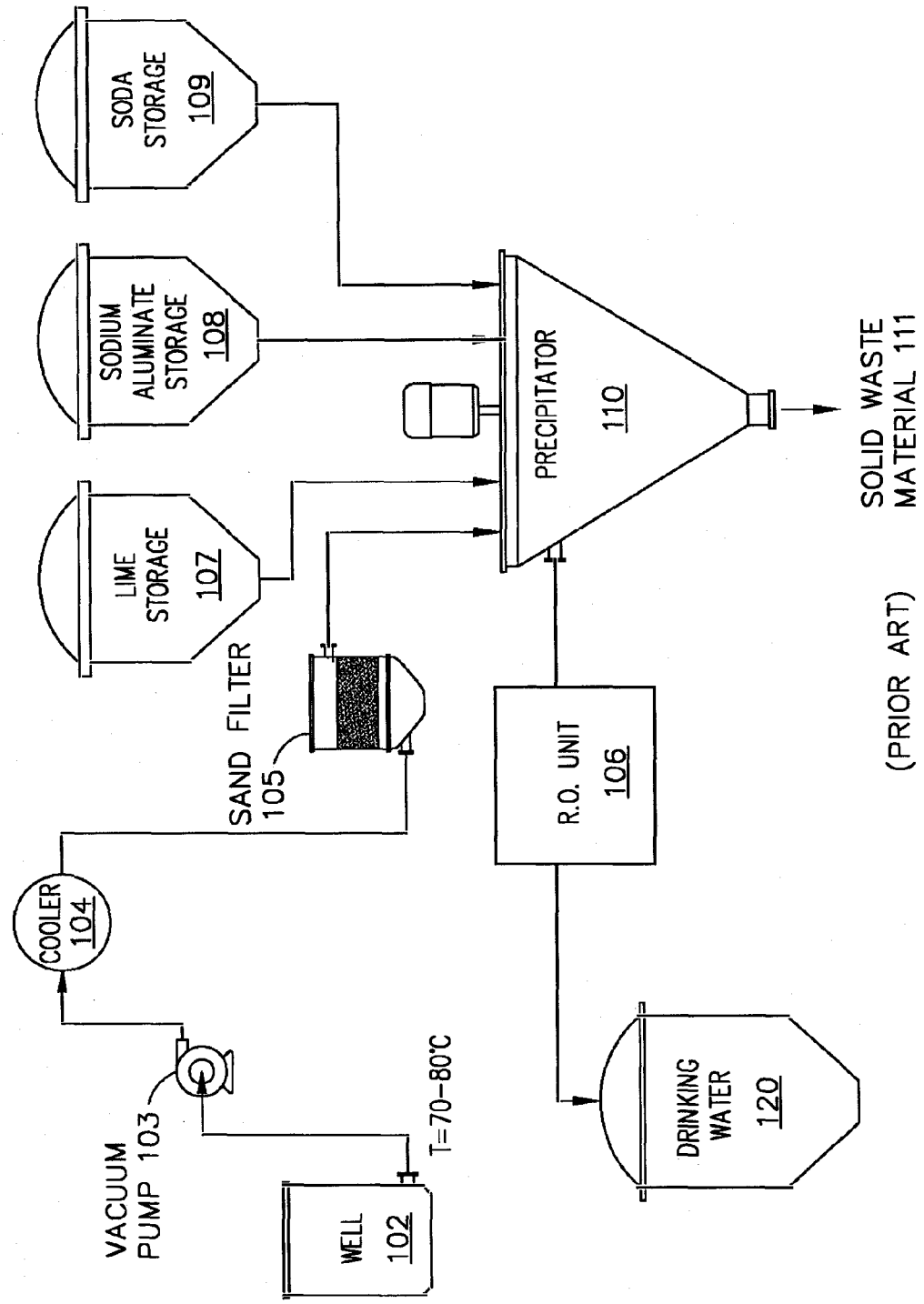
FIG. 1 is a flow diagram of the prior art of performing reverse osmosis.

The following disclosure illustrates several embodiments in detail. A relatively inexpensive, low energy consumption, but highly effective desalination procedure for removal of heavy metal contaminants and dissolved salts from water and brackish water is needed. FIG. 1 shows a production of drinkable water using an expensive reverse osmosis process. Reverse osmosis (RO) is a filtration method that removes many types of large molecules and ions from solutions by applying pressure to the solution when it is on one side of a selective membrane. The resultant solute is retained on the pressurized side of the membrane and the pure solvent is allowed to pass to the other side. To be "selective", this membrane should not allow large molecules or ions through the pores (holes), but should allow smaller components of the solution (such as the solvent) to pass freely. Reverse osmosis is most commonly known for its use for the production of drinking water from seawater desalination by removing the salts and other substances from the water molecules. The reverse osmosis process is effective but very time consuming, expensive and laborious. The operating pressure for reverse osmosis is between 40-60 bar and the pore size of either cellulose acetate or polysulfone coated with aromatic polyamides are <0.002 μm.

The instant description enables the user to use various combinations of aeration system, filtration system, vacuum pumps, suction pump, membrane based distillation system, vacuum pump, heat exchangers, splitter, and pressure retarded osmosis apparatus to desalinate brackish and/or unusable water and provide drinking water and/or usable water for human consumption. Various examples and their benefits in producing desalinated water through low cost high efficiency using various combinations of configuration of systems are described as examples below. The instant description specifically concentrates on the aeration system, filtration system; pressure retarded osmosis system/apparatus and membrane distillation system to produce desalinated drinkable water.

Figure 2:
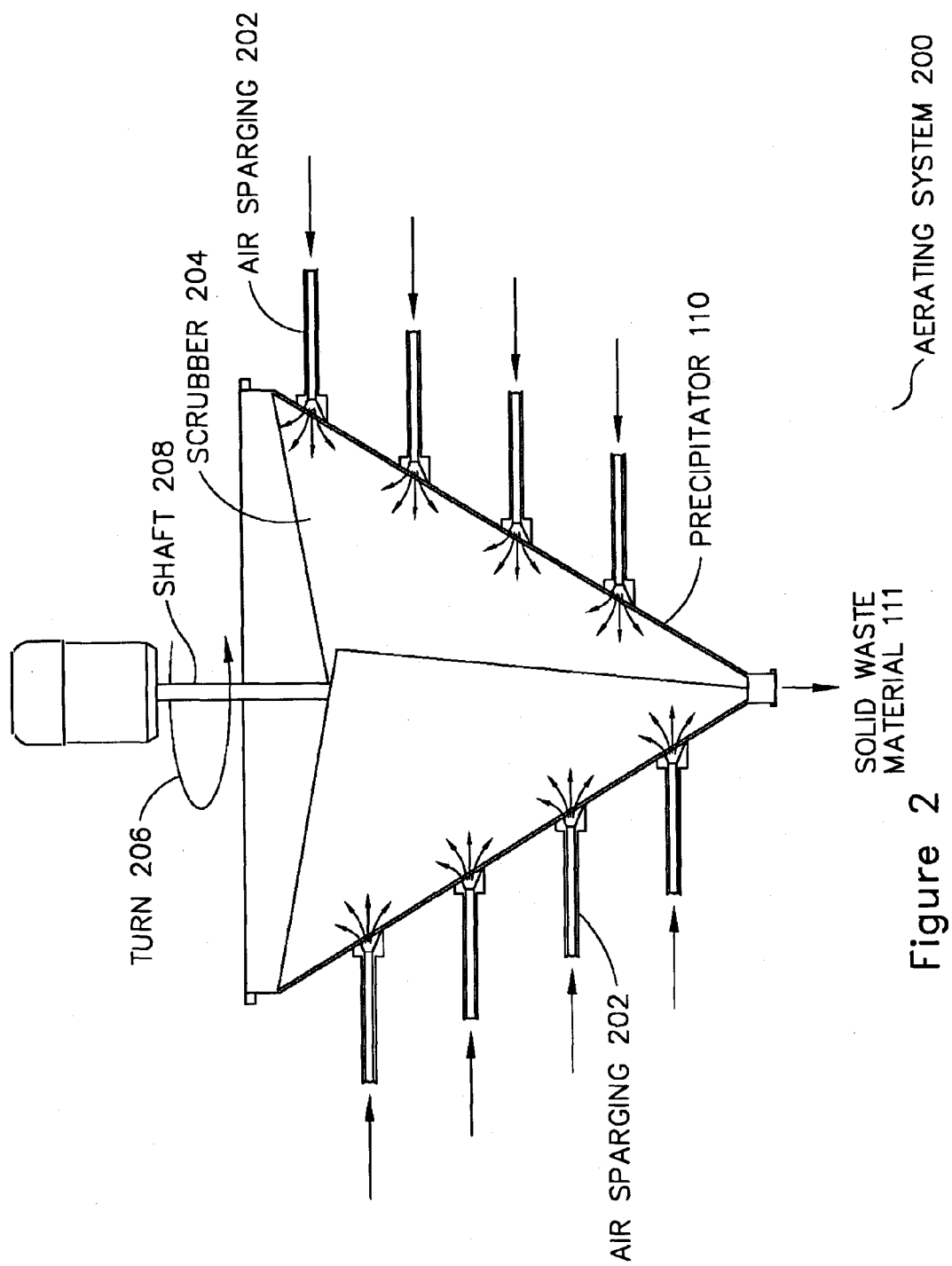
FIG. 2 shows an aeration system 200.

FIG. 2 shows an aeration system 200. Aeration system includes conical vessel precipitator 110 with smooth internal surface and scrubber 204. This aeration system will be used as a pretreatment before membrane distillation (MD) system stage to reduce and minimize the fouling in the MD system. Generally, the deep well waters contain various types dissolved chemicals such as salts and salt ions such as iron (Fe), manganese (Mn), calcium (Ca) and magnesium (Mg) salts including other solids such as the silica from aquifer rocks as waste. The temperature of the well water is between 70-80° C. at the depth of 2500 meters. The hot well water is pumped into an aeration unit which results in the precipitation of Ferrous/Ferric oxide. Also, the salts causing hardness will be deposited in aeration tank due to the high temperature of the well water. Brackish waters are usually regarded as those containing 0.5 to 30 parts per thousand salt, while the average saltiness of seawater is 35 parts per thousand.

One of the primary dissolved chemical as waste in well water may be in the form of salt. For example, well water has calcium bicarbonate and calcium sulfates as dissolved chemicals. Calcium bicarbonate changes to calcium carbonate at temperature above 50° C. which precipitates while carbon dioxide is liberated and the calcium carbonate forms a waste 250. This may be considered as a first precipitant.

Calcium carbonate is known as alkaline waste. The following reactions occur upon cooling the well water:

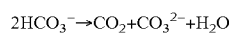

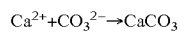

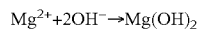

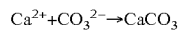

The formation of $CaCO_3$ or $Mg(OH)_2$ or both depends on the operation parameter of the plant. Higher temperatures and higher pH values favor the formation of $Mg(OH)_2$. The scaling tendency of water due to increase in $CaCO_3$ and with increase in temperature, pH, and decreases with the partial pressure of carbon dioxide.

The other important type of scale in brackish water and seawater is the calcium sulfate scale. There are three formulae of calcium sulfate which can be formed in seawater. Anhydrite $CaSO_4$, hemihydrate $CaSO_4.½H_2O$ and dihydrate $CaSO_4.2H_2O$ (gypsum). It is clear that gypsum ($CaSO_4.2H_2O$) is stable at low temperatures while the anhydrite is stable at higher temperatures. Even though the anhydrite form of gypsum can be formed above 40° C. due to its lower solubility, on the other hand while gypsum can be formed at temperature up to 100° C.

Another precipitant such as manganese is oxidized and converted to deposit on the cooling towers as a solid waste 111. This may be considered as a second precipitant.

These dissolved chemicals in well water that may be brackish water as a waste can be precipitated from water to be used as adsorbent. This solid waste can be removed by operating the scrubber in certain time intervals and use the removable solid as a new adsorbent to adsorb heavy metals from well water.

Figure 3:
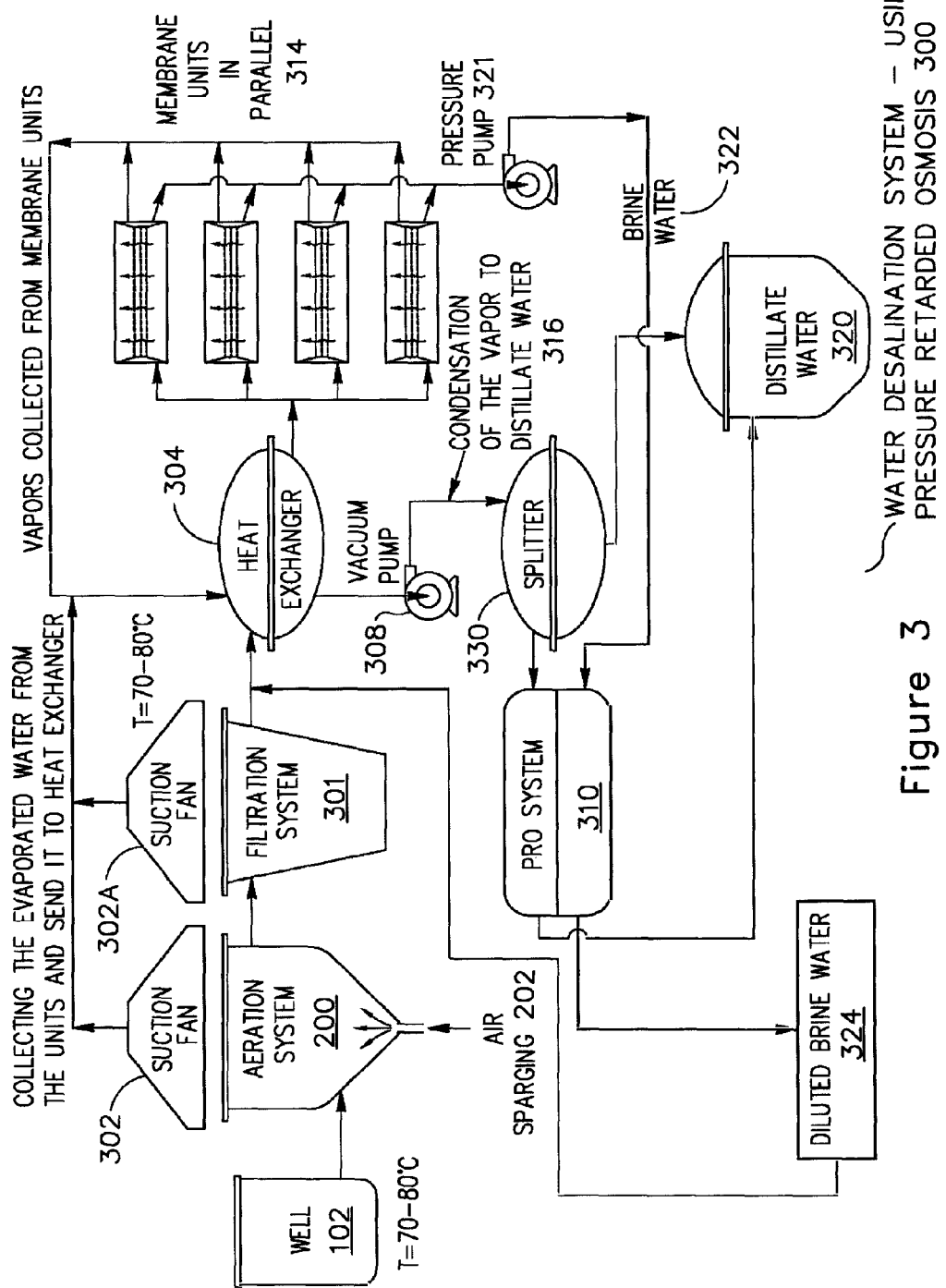
FIG. 3 shows a schematic view of the method, system and apparatus to perform the Pressure Retarded Osmosis (PRO system) for treating brackish water to produce distillate water.

FIG. 3 shows a water desalination system which comprises of Pressure retarded osmosis system 300. This system is a combination of various systems to produce desalinated distillate water 320 for human consumption. Well water 102 (brackish water as well) is pumped into an aeration system to remove contaminants (precipitating and dissolving) and precipitants. Since the well water is hot some water vapor is collected using suction fan 302 to send it to heat exchanger 304. Salts that cause hardness to the well water are precipitated by using air sparging in the aeration system.

Distillate water from the MD is pumped to a PRO apparatus 310 containing a semi-permeable membrane. The distillate water flows on one side of the membrane and diffuses through the membrane into the concentrate side of the membrane filled with brine brackish water. The distillate water from PRO system is collected in distillate water tank 320 for consumption. The brine generated by the PRO system is either recirculated to the feed stream for further purification or used as near zero level brine free water for consumption.

Subsequently, well water is passed to filtration unit 301 to remove any suspended materials. In aeration stage and filtration stage, any water that evaporated will be collected by using suction fan (302-302A etc) and the vapor is further transported to the heat recovery system (heat exchanger 304). The water is passed through the aeration system (e.g. brackish water) and filtration system (e.g. secondary brackish water) to reduce membrane fouling as well. Otherwise the organic substances etc promote microorganism and bacterial growth and cause biofouling of the membrane. The heat exchanger transfers the heat to the feed stream for the membrane distillation system comprising of several membrane units in parallel (314) and the water vapor may be condensed to distillate water 320 and collected in distillate water tank to be distributed for human consumption.

Through the heat exchanger 304 the water is sent to membrane distillation system. The membrane distillation (MD) system is made up of several membrane units that are used in parallel 314. Each MD system contains a hydrophobic membrane (PVDF) to separate water and dissolved minerals. The membrane distillation process includes micro-porous hydrophobic hollow fiber membrane modules. Therefore, the operating pressure will be equal to the natural atmospheric pressure (equal to 1-bar). PVDF membrane is chosen in this study for membrane preparation because it is a commercially available hydrophobic polymer. The membrane distillation process includes micro-porous hydrophobic hollow fiber membrane modules. Therefore, the operating pressure will be equal to the natural atmospheric pressure (equal to 1-bar).

The operating temperatures in this new innovative process can be maintained as low as 50° C. and the operating pressure for MD will be equal to the natural atmospheric pressure (equal to 1-bar). This will make this process high energy efficient and cost effective, especially when combined with low grade energy sources (the energy source for this process is a natural energy source from the deep well water, where the water temperature of the deep wells, upto 2500 m depth, ranges between 70-80° C.). Therefore, the main objective of this work is to develop a low cost process as an alternative process to RO for drinking water production from brackish water desalination plant with zero brine discharge.

The water feed to the MD system is hot (70-80° C.) and is brought into contact on one side of the hydrophobic membrane. The vacuum is applied through a vacuum pump 308 through the membrane permeate side. Hydrophobic nature of the functional membrane prevents the liquid water streams stay outside the membrane while water vapors will penetrate from the feed side. The pressure gradient such as a higher partial pressure than the permeate side with a lower partial pressure also enhances the separation. This enables distillate water will be collected in the permeate side in a continuous manner. Another pressure pump 321 is used between the MD system and spiltter 330. After the water has passed the MD system and has not passed through the membrane as a vapor would become a retentate stream which contains concentrated solutes in it. In order to further desalinate it is passed through the PRO system and collected as diluted brine water 324. The diluted brine water 324 is circulated back to the system for getting processed via the MD units in parallel 314. The water vapor is passed to the heat recovery system to transfer the heat to the feed of MD unit and the water vapor will be condensed to water form and collect in distillate water tank.

The operating temperatures in this new innovative process can be maintained as low as 50° C. and the operating pressure will be equal to the natural atmospheric pressure (equal to 1-bar). This will make this process high energy efficient and cost effective, especially when combined with low grade energy sources (the energy source for this process is a natural energy source from the deep well water, where the water temperature of the deep wells, up to 2500 m depth, ranges between 70-80° C.).

The very low operating pressure allows thinner piping and fewer maintenance problems. Also, the capital and maintenance expenses for MD will be lower in comparison to pressure-driven membrane separation processes like RO. The integrated MD systems will be a potential alternative to RO water desalination because the thermal energy is naturally available from the deep wells.

In this example, the hot water (70-80° C.) is pumped from the deep well to the aeration unit including air sparging to precipitate most of the salts causing hardness and, to precipitate iron oxides and manganese oxides by using heat treatment and aeration process as explained in section "aeration system to reduce membrane fouling". Then, water is passed to filtration unit to remove any suspended materials. In aeration stage and filtration stage, any water evaporated will be collected by using suction fan and send this vapor to the heat recovery system (heat exchanger) to transfer the heat to the feed of MD unit and the water vapor will be condensed to water form.

Therefore, membrane distillation (MD) in which pure water (distillate water) is produced as permeate from the MD process and the distillate water is then split into two streams; one will go to collection tank for distilled water and the second stream will go to PRO system 310.

After filtration stage, water is passed to membrane distillation (MD). In membrane distillation (MD), Vacuum is applied in the permeate side of the membrane module by means of a vacuum pump. In this case, condensation occurs outside of the membrane module by using energy recovery system (heat exchanger). On the membrane permeate side, vacuum will be applied in the membrane permeate side. Because of the hydrophobic nature of the functional membrane, liquid water streams will be kept outside the membrane while water vapors will penetrate from the feed side with a higher partial pressure to the permeate side with a lower partial pressure. In this way, fresh water will be collected in the permeate side in a continuous manner.

A concentrated MD retentate stream (brine water) will be returned to the PRO unit and the diluted brine water from the PRO unit will be circulated as the MD feed stream (that is mean that, zero brine discharge).

Part of the distillate water from MD is pumped into a PRO system containing membranes, semi-permeable. The distillate water flows on one side of the membrane and diffuses through the membrane into the other side of the membrane filled with brine brackish water.

In addition, the specification and drawings are to be regarded in an illustrative rather than as in a restrictive sense.

What is claimed is:

1. An apparatus, comprising:
   an aeration system having a conical vessel, a smooth inner surface and a scrubber to separate a precipitating particle from a brackish water;
   a filtration unit to remove a suspended particle in the brackish water and sending a filtered water for further processing;
   a distillation system to process brackish water, wherein the distillation system is a membrane distillation system producing distillate water and brine water;
   a pressure retarded osmosis system to dilute a brine water from the membrane distillation system by passing through a membrane between a first stream of a distillate water coming from a splitter and the brine water from the membrane distillation system and produce a dilute brine water; and separate containers to collect the distillate water from the pressure retarded osmosis for consumption and the diluted brine water.

2. The apparatus of claim 1, further comprising;

the splitter arranged to send a stream of distillate water from membrane distillation system to the container collecting distillate water for consumption.

3. The apparatus of claim 1, further comprising;

a suction fan to collect an evaporated water for at least one of the aeration system and the filtration unit and sending it for further processing to at least one of a heat exchanger and a membrane units in parallel.

4. The apparatus of claim 1, further comprising;

the heat exchanger to harness a retentate stream temperature and maintain the heat in the distillate water that is being desalinated.

5. The apparatus of claim 1, further comprising;

a membrane distillation unit comprising of several membrane units in parallel, having a hydrophobic membrane to.

6. The apparatus of claim 5, further comprising;

a vacuum pump to collect a water vapor from a permeate side of the membrane distillation unit and send it to at least one of a heat exchanger and a distillate water collection tank.

7. A process of water desalination, comprising;

pumping a brackish water from a well to an aeration system as a feed stream to remove a precipitating a soluble contaminant as a pretreatment of the brackish water to form a secondary brackish water for further processing;

filtering the secondary brackish water to remove a contaminant and to reduce fouling;

distilling the filtered secondary brackish water using a membrane distillation system to produce a distillate water and brine water;

directing distillate water to a pressure retarded osmosis to further dilute the brine water from the membrane distillation step by passing through the distillate water over a membrane as a first stream and as a second stream the brine water from the membrane distillation system to produce a diluted brine water; and collecting the distillate water and the diluted brine;

said distillate water is collected in a tank and is suitable for human consumption;

the diluted brine can be recirculated back to the process for a zero brine production, or can be directed to a further use.

8. The process of claim 7, further comprising;

heating the feed stream using solar energy prior to aeration to precipitate the soluble contaminants.

9. The process of claim 7, wherein the distillation is performed using a hydrophobic membrane.

* * * * *